United States Patent Office 2,992,208
Patented July 11, 1961

2,992,208
RESIN MANUFACTURE

Ivor W. Mills, Glenolden, and Peter B. Murray, Swarthmore, Pa., assignors to Sun Oil Company, Philadelphia, Pa., a corporation of New Jersey
No Drawing. Filed Aug. 17, 1959, Ser. No. 833,910
9 Claims. (Cl. 260—67)

This invention relates to the production of resins, and more particularly to a continuous method for reacting formaldehyde with polynuclear aromatics or a cracked petroleum fraction rich in such aromatics.

This application is a continuation-in-part of copending application Serial No. 581,378 filed April 30, 1956 which is now abandoned.

So called dinaphthyl methane resins, formed by reacting formaldehyde with naphthalene or alkyl substituted naphthalenes, have found considerable commercial use as plasticizers for polyvinyl chloride resins, ingredients of printing inks, and as paint resins. Similar resins may be made from formaldehyde and other polynuclear aromatics such as anthracene. The reaction is commercially carried out in liquid phase, at temperatures in the vicinity of 200–230° F. in the presence of an acidic catalyst, such as sulfuric acid. This process suffers from two serious drawbacks, first, since considerable time is required for the reaction to go to completion, the process is necessarily carried out batch-wise, and, second, due to side reactions such as sulfonation, surface-active materials are formed which give rise to emulsion trouble, with consequent difficulty in separating reaction products from the catalyst.

It is an object of this invention to provide a continuous process for producing resins from formaldehyde and polynuclear aromatics.

It is a further object of this invention to provide a process for producing resins which presents no problems in separating reaction products from the catalyst.

We have found that the foregoing objects may be attained by mixing formaldehyde or a substance which will decompose to yield formaldehyde under process conditions, such as paraformaldehyde or methylal, with naphthalene, alkyl naphthalenes, or with other polynuclear aromatics or with a cracked petroleum fraction rich in polynuclear aromatics, heating the mixture to a temperature of between 300° F. and 500° F. and contacting the mixture with a solid phosphoric acid catalyst. Under these conditions, paraformaldehyde will depolymerize to monomeric formaldehyde which will react rapidly with the aromatics to form resins so that the mixture need be in contact with the catalyst for only a short period of time, usually less than one minute. Similarly, methylal will decompose to yield monomeric formaldehyde.

The solid phosphoric acid catalyst used in the process is familiar to those skilled in the art, it being the catalyst commonly used to polymerize normally gaseous olefins to form "polymer gasoline." A preferred catalyst is one in which orthophosphoric acid is the primary active ingredient and which contains about 15% to 20% free phosphorous pentoxide, i.e. the ortho acid contains about 15% to 20% of the pyro acid corresponding to the primary phase of dehydration of the ortho acid. The catalyst known in the trade as U.O.P. catalyst contains about 18% free phosphorous pentoxide and this catalyst is particularly suited to the process of the present invention. Materials which may be used as adsorbents or carriers for the acid are diatomaceous earth, kieselguhr and other artificially prepared porous materials of siliceous character. The preferred adsorbent is kieselguhr. The catalyst may be formed by mixing phosphoric acid with a solid adsorbent material to form a paste, calcining the paste to a solid cake, and grinding the cake to the desired size. Alternatively, the paste may be extruded or pelleted prior to calcination.

At temperatures below about 300° F. the reaction appears to proceed too slowly to be of much interest as a commercial operation, and in addition, the formaldehyde in the feed will not be completely depolymerized and such portion as may be depolymerized will tend to repolymerize and clog the equipment. At temperatures of 550° F. and above, the resins formed are thermally unstable. If any substantial amounts of resins are formed at the latter temperatures, a large proportion are apparently cracked, since yields of the desired resins are very low. At temperatures in the vicinity of 450° F., the reaction proceeds readily with good yield. The process can be operated at atmospheric pressure, but since slightly superatmospheric, for example, up to 100 p.s.i.g., such as 20 p.s.i.g., apparently improves the yield somewhat, such higher pressures are preferred. In general, the mol ratio of formaldehyde to polynuclear aromatics should be from about 1:2 to 2:1, although ratios outside this range can be used.

After contact with the catalyst, the products, including resins and unreacted hydrocarbons and formaldehyde are taken to a fractionating tower in which unreacted materials are taken overhead, while the resins are removed as bottoms. Fractionation is preferably carried out under vacuum since the resins are thermally unstable, and care should be taken that the bottoms temperature does not rise above 500° F. during the fractionation. Unreacted formaldehyde in the overhead fraction will polymerize to paraformaldehyde when the overhead is condensed, and may be removed for recycle to the process. In the event that the hydrocarbon feed to the process is naphthalene, anthracene, or a fairly concentrated mixed aromatic fraction, the hydrocarbons may also be recycled. When, however, the feed is a catalytically cracked gas oil, it is preferred to send the unreacted hydrocarbons back to the catalytic cracker. Since a substantial portion of the aromatics in the feed have been removed by reaction with formaldehyde, the unreacted gas oil will be less aromatic than the feed to the process, and hence more suitable as a cracking stock.

In order that those skilled in the art may more fully appreciate the nature of our invention and a method for carrying it out, the following examples are given.

Example 1

A quantity of catalytically cracked gas oil boiling in the range of 450° F. to 650° F. and which contained about 30% aromatics, largely alkyl naphthalenes, was mixed with paraformaldehyde in an amount such that the mol ratio of formaldehyde to aromatics was 1:1. The mixture was heated to 350° F. to depolymerize the paraformaldehyde, and it was continuously passed partly in liquid and partly in vapor phase, at atmospheric pressure, through a tube packed with solid phosphoric acid catalyst, having a $P_2O_5$ content of 18% and a kieselguhr adsorbent, the average time of contact of the feed with the catalyst being about one minute. The effluent from the catalyst chamber was continuously collected and was fractionally distilled under vacuum. From each 100 cc. of product, 5.45 grams of a resin boiling above 400° F. at 40 mm. of mercury was recovered.

Example 2

The procedure was the same as in Example 1 except that the reaction temperature was 450° F. A yield of 7.7 grams of resin per 100 cc. of product was obtained.

Example 3

Conditions were the same as in Example 2 except that a pressure of 20 p.s.i.g. was maintained in the catalyst chamber. Yield of resin was 9.5 grams per 100 cc. of reaction product.

*Example 4*

A mixture was made up as in Example 1 and it was passed over the catalyst at 550° F. A yield of resin of only 2.08 grams per 100 cc. of reaction product was obtained.

We claim:
1. A process for producing resins which comprises contacting a reaction mixture comprising from about 1 to 2 moles of a polynuclear fused ring aromatic hydrocarbon and from about 1 to 2 moles of formaldehyde at a reaction temperature of from 300° F. to 500° F. with a solid catalyst comprising orthophosphoric acid containing about 15% to 20% free $P_2O_5$ distended on a siliceous carrier, recovering a reaction product, and separating a resinous material from the product.

2. A process for producing dinaphthyl methane resins which comprises contacting a reaction mixture comprising from about 1 to 2 moles of a bicyclic fused ring aromatic hydrocarbon and from about 1 to 2 moles of formaldehyde at a reaction temperature of from 300° F. to 500° F. with a solid catalyst comprising orthophosphoric acid containing about 15% to 20% free $P_2O_5$ distended on a siliceous carrier, recovering a reaction product, and separating a dinaphthyl methane resin from the reaction product.

3. The process according to claim 2 in which the reaction is carried out at superatmospheric pressure.

4. A continuous process for producing dinaphthyl methane resins which comprises continuously passing a reaction mixture comprising from about 1 to 2 moles of a bicyclic fused ring aromatic hydrocarbon and from about 1 to 2 moles of formaldehyde to a reaction zone, contacting the reaction mixture therein with a solid catalyst comprising orthophosphoric acid containing about 15% to 20% free $P_2O_5$ distended on a siliceous carrier at a temperature of from 300° F. to 500° F., continuously withdrawing an effluent from the reaction zone, and separating a dinaphthyl methane resin from the effluent.

5. The process according to claim 4 in which the reaction zone is maintained under superatmospheric pressure.

6. A process for producing dinaphthyl methane resins which comprises mixing from about 1 to 2 moles of paraformaldehyde with a cracked petroleum fraction containing from about 1 to 2 moles of alkylated naphthalenes, heating the mixture to a temperature of from 300° F. to 500° F., contacting the heated mixture with a solid catalyst comprising orthophosphoric acid containing about 15% to 20% free $P_2O_5$ distended on kieselguhr, recovering a reaction product and separating a dinaphthyl methane resin from the product.

7. The process according to claim 6 in which the reaction is carried out under superatmospheric pressure.

8. A continuous process for producing dinaphthyl methane resins which comprises mixing from about 1 to 2 moles of paraformaldehyde with a cracked petroleum fraction boiling from about 450° F. to 650° F., said cracked fraction containing from about 1 to 2 moles of alkylated naphthalenes, heating the mixture to a temperature of from 300° F. to 500° F., continuously passing the heated mixture to a reaction zone, contacting it therein with a solid catalyst, comprising orthophosphoric acid containing about 18% free $P_2O_5$ distended on kieselguhr, continuously withdrawing an effluent from the reaction zone and separating a dinaphthyl methane resin from the effluent.

9. The process according to claim 8 in which the reaction zone is maintained under superatmospheric pressure.

References Cited in the file of this patent

UNITED STATES PATENTS

| | | |
|---|---|---|
| 2,186,022 | Holm | Jan. 9, 1940 |
| 2,200,763 | Anderson et al. | May 14, 1940 |
| 2,501,600 | Feasley | Mar. 21, 1950 |

OTHER REFERENCES

Brooks et al.: The Chem. of Petroleum Hydrocarbons, vol. III, 1955, pp. 232–234, 247.